A. O. AUSTIN.
LOADING RACK.
APPLICATION FILED MAY 12, 1916.
1,281,267.
Patented Oct. 15, 1918.
6 SHEETS—SHEET 5.
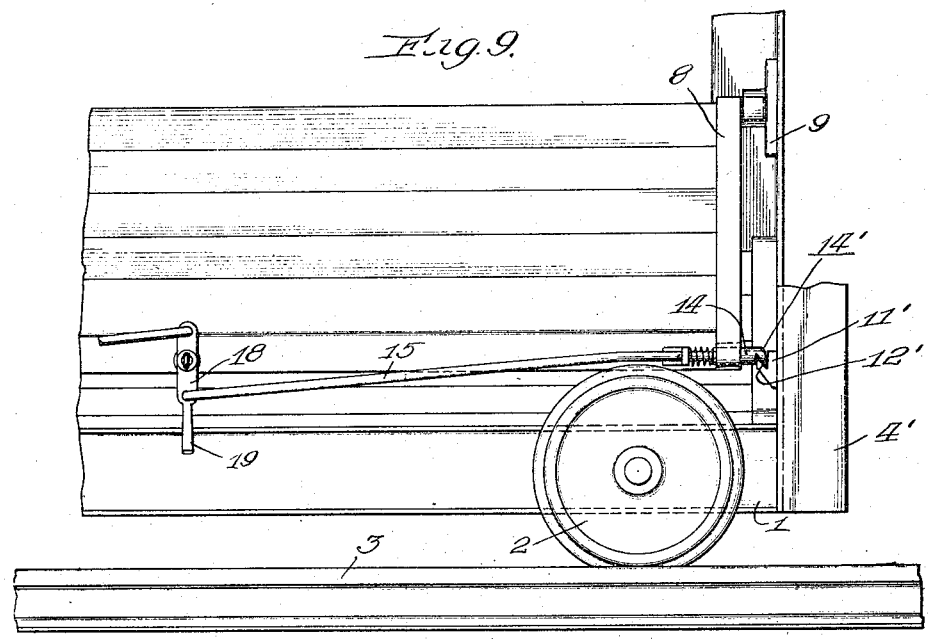
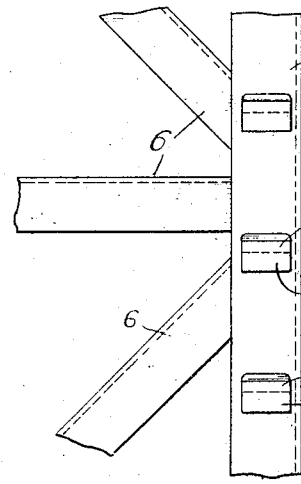
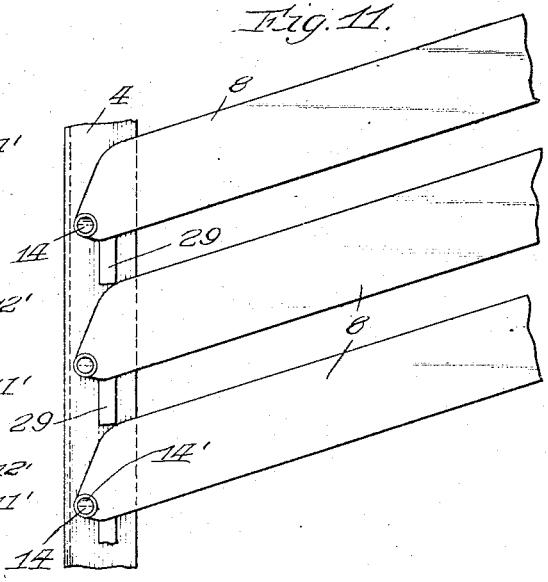
Witness
R. C. Farrington
Inventor,
Arthur O. Austin.
By Brown Nissen & Sprinkle
Attys.

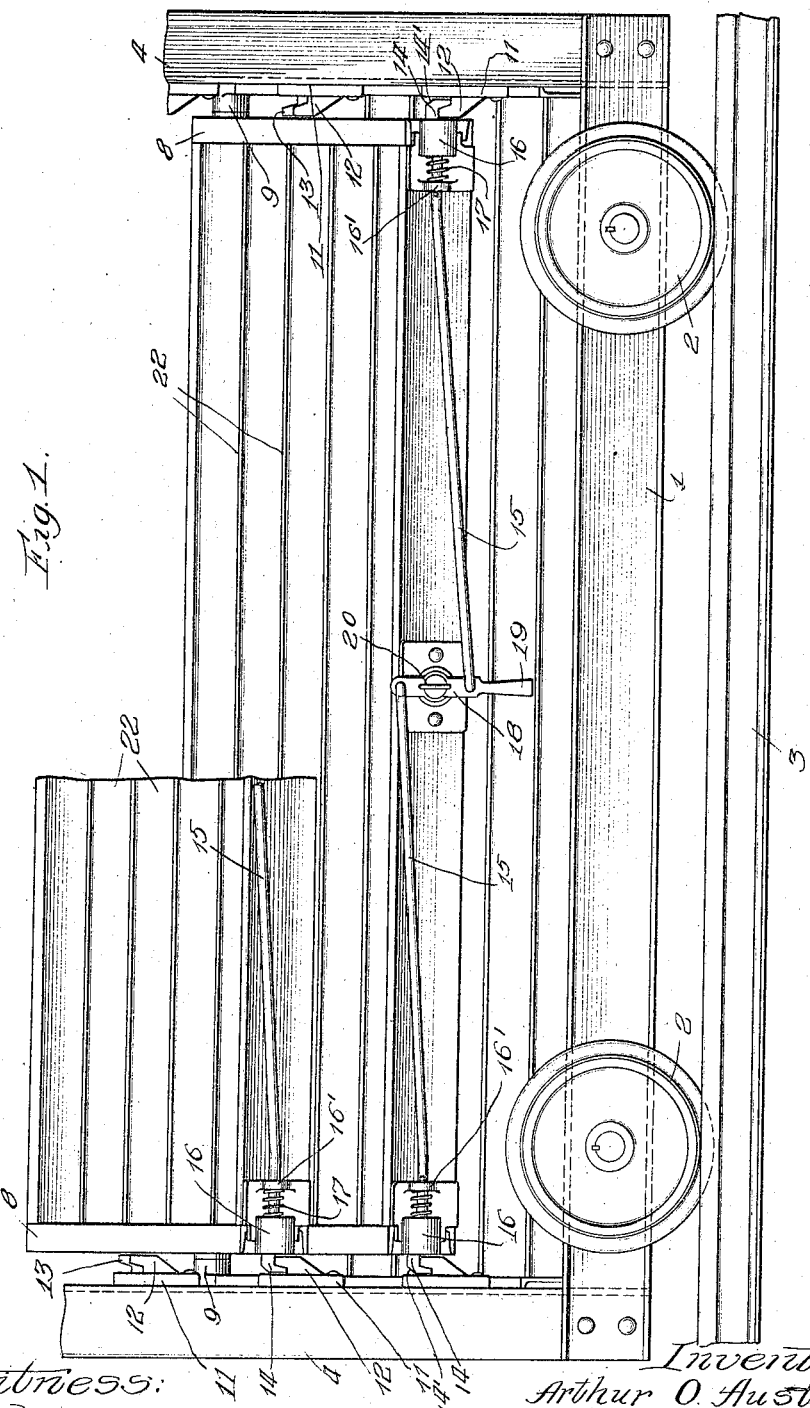

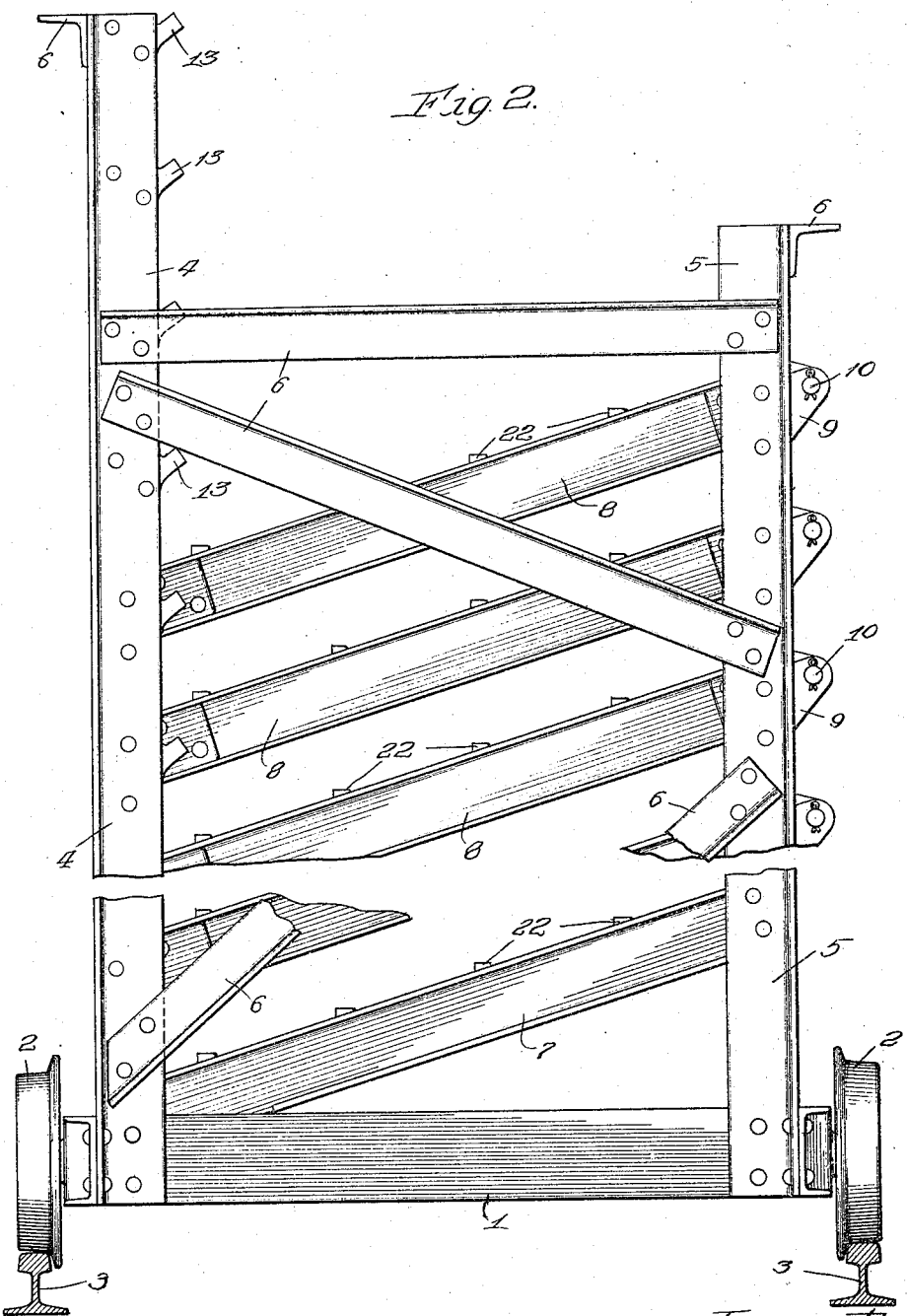

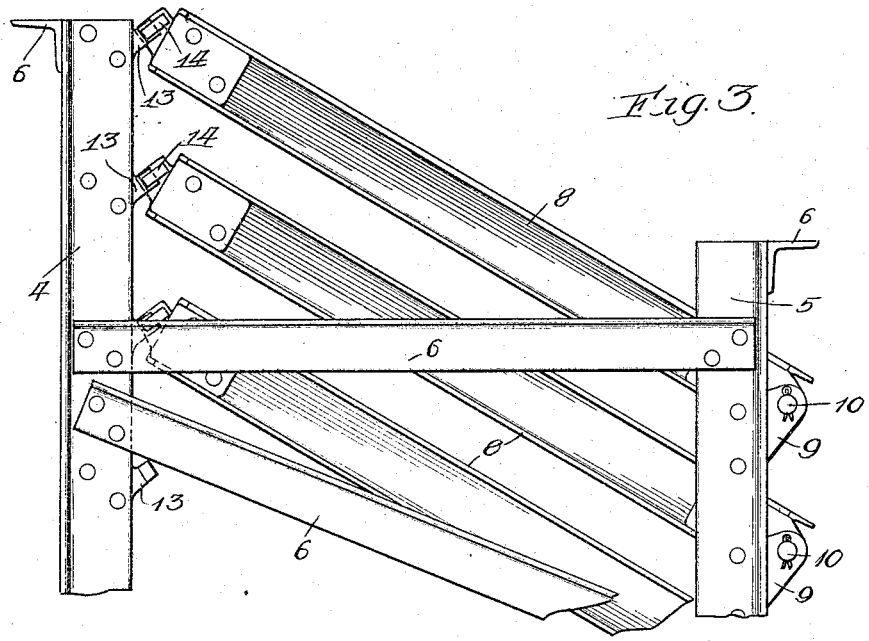
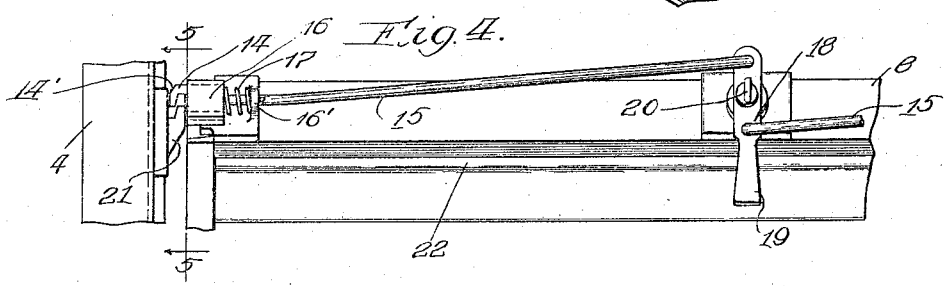
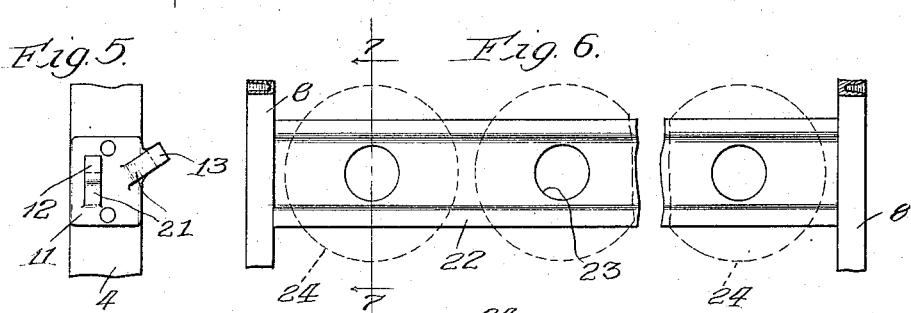
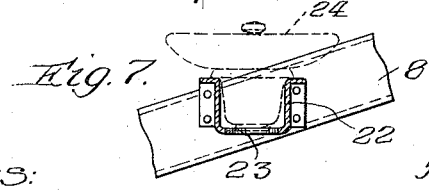

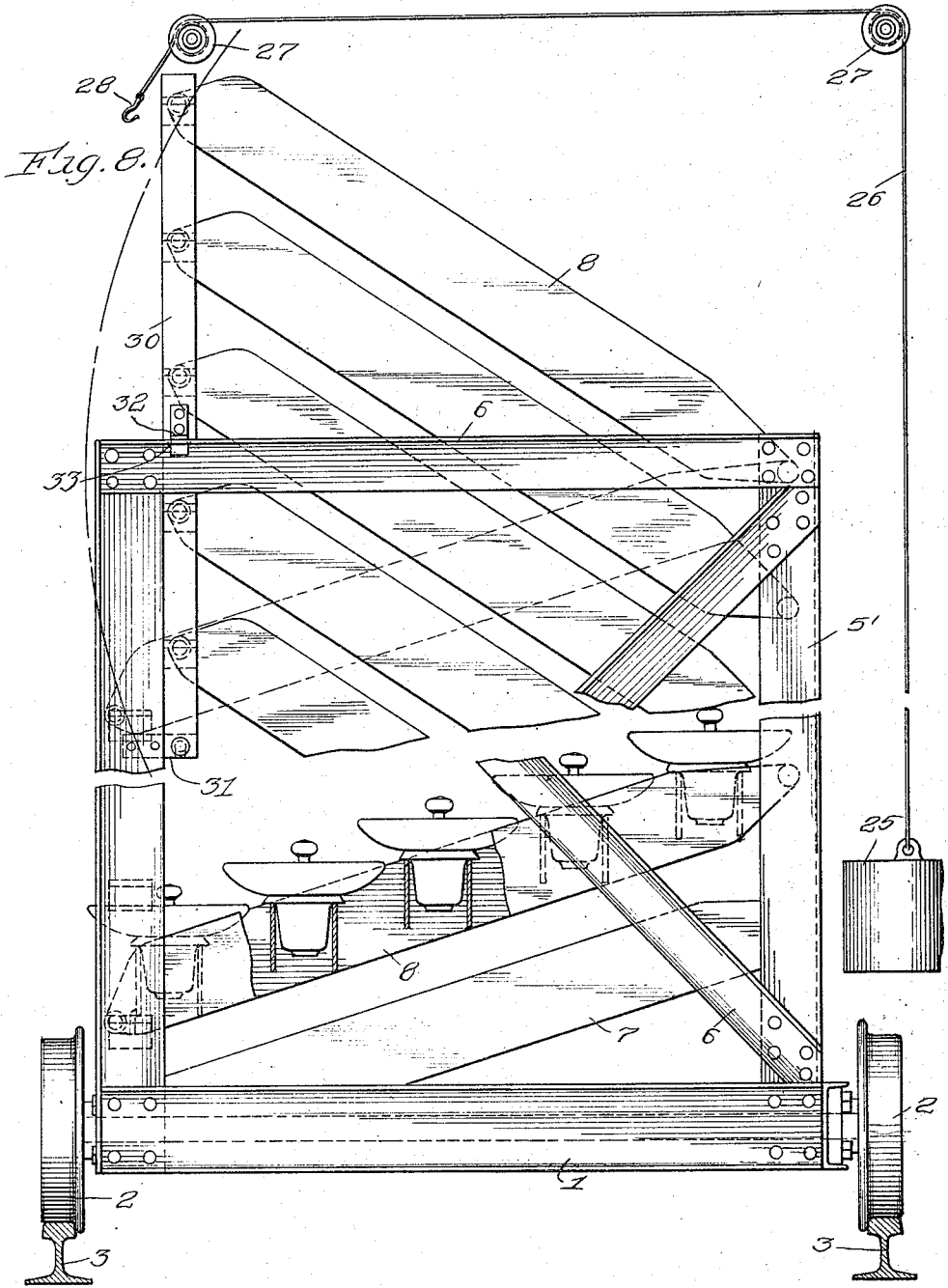

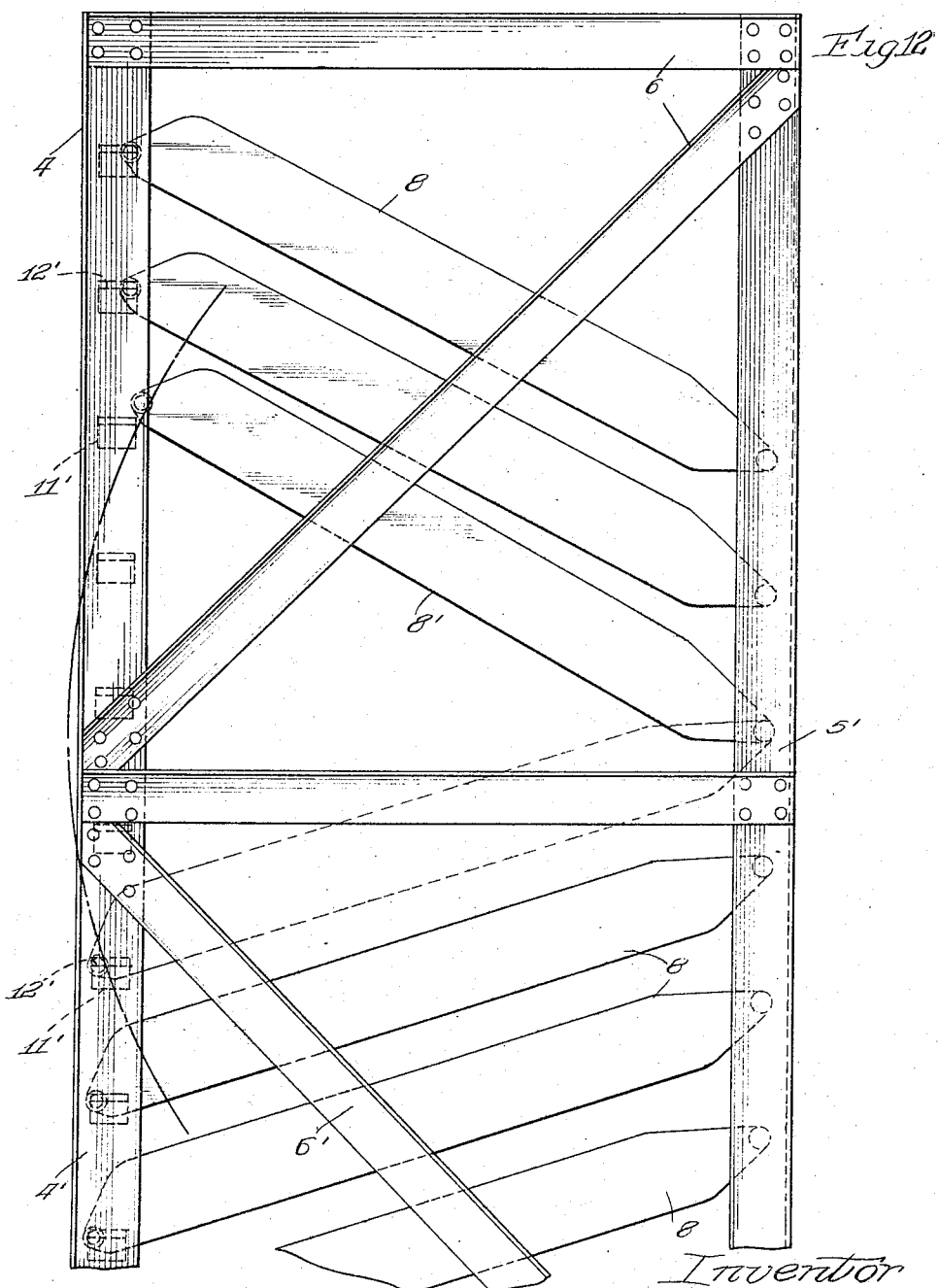

UNITED STATES PATENT OFFICE.

ARTHUR O. AUSTIN, OF BARBERTON, OHIO, ASSIGNOR TO THE OHIO BRASS COMPANY, OF MANSFIELD, OHIO, A CORPORATION OF NEW JERSEY.

LOADING-RACK.

1,281,267.	Specification of Letters Patent.	Patented Oct. 15, 1918.

Application filed May 12, 1916. Serial No. 96,990.

*To all whom it may concern:*

Be it known that I, ARTHUR O. AUSTIN, a citizen of the United States, residing at Barberton, in the county of Summit and State of Ohio, have invented certain new and useful Improvements in Loading-Racks, of which the following is a specification.

This invention relates to a rack for holding materials, and the construction is such as to facilitate reaching in between the shelves or trays for loading and unloading material. The principal object of the invention is to provide a new and improved loading rack of this kind in which the invention consists in the novel features in the construction, combination and arrangement of the several parts.

In the drawings,—

Figure 1 is a front view, with parts broken away, of a loading rack in the form of a wheeled truck constructed in accordance with the principles of this invention.

Fig. 2 is an end elevation.

Fig. 3 is an end elevation of a portion of the rack showing some of the shelves in raised position.

Fig. 4 is a detail showing the locking mechanism at the front of each tray.

Fig. 5 is a detail of one of the tray-holding latches taken on line 5—5 of Fig. 4.

Fig. 6 is a detail of one of the supporting shelves of each tray.

Fig. 7 is a sectional view taken on line 7—7 of Fig. 6.

Fig. 8 is a side elevation with parts shown in section of an insulator rack and a removable extension thereof.

Fig. 9 is a front elevation of a portion of the rack shown in Fig. 8.

Fig. 10 shows the catches used in the rack shown by Fig. 8.

Fig. 11 illustrates the number of trays formed with spacing projections; and,

Fig. 12 is a side elevation of a rack of this kind, illustrating more clearly the manner in which the catches for the several trays are engaged only at their upper and lower positions.

The loading rack herein shown and described, is particularly designed and adapted for handling insulators, as shown more clearly by Figs. 6, 7 and 8, in which the insulators are held upright, but the trays are inclined, so that the extending flanges or petticoats of the insulators will overlap, as shown in Fig. 8, to economize the space used in packing or storing the insulators. It is obvious of course that this construction may be applied and used for any other article which it is desired to store away, or to place in a drier, or to transport from place to place. Of course the construction can be made stationary by omitting the wheels, and the trays may be of any suitable shape or construction.

In the present embodiment of the invention, a base 1, is supported by wheels 2, for movement upon rails 3. Extending from the base 1, are uprights 4 and 5, as shown in Figs. 1, 2 and 3, of which the uprights 4 at one side of the base are higher than the other uprights. These uprights are connected by braces 6 for forming a rigid structure. A plurality of trays 7 and 8, constructed of metal, or any other suitable material, substantially rectangular in form, are mounted in the rack, the lower tray 7 being rigidly connected at the bottom of the rack and disposed at an angle therein, somewhat less than a right angle. The other trays 8 are pivoted in brackets 9 which are secured to the uprights 5, by means of pivot pins 10. These trays 8 are spaced apart usually at equal distances, depending upon the size or nature of the articles which they are to hold, and at their free ends are supported in any suitable manner. One supporting means, comprises brackets 11 secured to the insides of uprights 4, and some of the brackets are formed both with lugs 12 and 13, (see Fig. 5) of which the latter is at an angle extending inwardly from the upright, each tray having latches 14 at the ends for engaging the lugs. In this form of rack, some of the lower brackets 11 are provided only with the supporting lugs 12, and some of the upper brackets are provided only with the supporting lugs 13, while the intermediate brackets are formed with both the lugs 12 and 13. The reason for this is, that the lower brackets are engaged only by the latches when the racks are in their downwardly inclined position parallel to the fixed rack 7, and the upper brackets 11 engage only the uppermost racks 8 when they are moved to their uppermost positions, as shown in Fig. 3, while the intermediate brackets 11 are engaged by some of the racks in their lowermost positions and by other racks in their uppermost positions. In the form of invention shown by Figs. 8, 9, 10 and 12, a bracket 11' is provided only with a single catch 12', which extends in a horizontal direction and is of somewhat greater width than are the lugs 12 and 13, shown in Fig. 5. With this construction, the bracket 11' is of sufficient width to engage a catch of one tray in its lowermost position, and the catch of another and different tray in its uppermost position, this form of the brackets 11' being considerably simpler than the other form shown and described.

For engaging and disengaging the racks and their latches 14 from the supporting lugs or brackets, a rod 15 is connected at one end of each latch, which extends through a movable supporting lug 16 at each end of each tray, the rod 15 extending through a support 16' adjacent thereto, with a spring 17 disposed between the supports, and bearing one end against the support 16', and at the other end against the latch, tending thereby to press the latch outwardly, and the other end of each rod 15 is connected to a lever 18, having a handle 19, and pivoted by means of an eye bolt 20 secured to the front of the rack 8. This eye bolt is used for raising and lowering the racks by some power means, such as indicated in Fig. 8, showing a counterweight 25, and a flexible cable 26 attached thereto, and passing over pulleys 27, on a hook 28, for engaging in the eye bolt.

The under surface of each lug 12, 13, or 12', is formed with an inclined portion 21, and the latches are beveled away at their upper ends, as indicated by the reference numeral 14', so that as the tray is moved about its hinge in an upward direction, the latch will automatically engage the lug of the bracket 11 or 11', corresponding to the position of the tray, it being necessary to raise the front of the tray slightly, as shown by the tray 8', in Fig. 12, and to then draw in the latches 14 at the ends by operating the hand lever 19, in order to move the tray downwardly past the supporting brackets from which the tray has been raised.

Another means for spacing the trays apart is shown in Fig. 11, in which a tray is formed with a downwardly extending projection 29, which engages the tray immediately below, thereby properly spacing the trays apart. With this construction, it will be necessary only to provide means for engaging the trays in their uppermost positions.

It will be obvious that in the lowermost position of all of the trays, as indicated more clearly in Fig. 2, they will all be parallel and spaced apart. Each tray is formed with a longitudinally extending shelf 22, or a number of such shelves arranged at an angle to the sides of the tray, as shown more clearly in Fig. 7, so that the articles which they are designed to support, will be held upright and in tiers, when the trays are in their lowermost position. This allows the flanges or petticoats of the insulators 24 to overlap each other, as clearly shown in Fig. 8, so that the insulators may be packed close together, thereby economizing in space. The shelves 22 in this case, are provided with perforations 23, through which the cap or extremity of the insulator may protrude, and also for allowing a more free circulation of air. This is particularly important in the drying of insulators, for unless each part of the insulator is subjected to substantially the same temperature, the parts may harden unequally, thereby producing a weakness in the finished product, which materially weakens it. This is another advantage in arranging the insulators in tiers, for by so doing, substantially the same air space is provided between the insulators, thus insuring that each insulator and all parts of each insulator will receive substantially the same drying effect.

It must be understood that in the operation of this device, the loading and unloading of the rack must be handled systematically. If the rack is entirely empty, before it can be loaded to its capacity, it will be necessary to throw all of the trays into their uppermost positions, with the exception of course of the lower tray 7, which is fixed. This leaves an angular space between the fixed tray 7 and the next upper tray 8, so that the tray 7 may be loaded without obstruction. After the lower tray is fully loaded, the next upper tray 8, which is empty, is lowered into engagement with its lowermost lug, so that it is substantially parallel to the lower and loaded tray 7, this tray 8 may then be loaded without obstruction, as before explained, and so on until all of the trays have been filled. When it is desired to unload the material, the top tray is unloaded first, and after unloading, it is thrown into its raised position, which makes the next lower tray freely accessible. If the trays were placed in a horizontal position when loaded, it can readily be seen that it would not be possible to load the rack to the same capacity, or with the same facility, for instead of placing five rows of insulators on each tray, as indicated in Fig. 8, it would be possible to place only three or possibly four, for the petticoats of the insulators prevent them from being packed close together, and it is only by placing them in tiers, partially overlapping each other, that the greatest economy in packing can be obtained. If in addition to placing the trays horizontal, they are made stationary, it can be seen that in order to load and unload the particular form of insulator, or any other similar device, the space between the trays must necessarily be increased at least fifty per cent., in order that access might be had to the several trays, and this would decrease the vertical capacity, or the number of trays which could possibly be held by a rack of given size. The previously employed method of constructing racks, with the trays horizontal and fixed, so decreases the capacity of a rack of given size, that it would have only about forty-five per cent. of the capacity of the construction herein shown and described.

When these racks are used for drying insulators, they are usually placed in a drier, and the capacity for a given height of rack may be further increased by making the uprights 4' and 5', as shown in Fig. 8, of equal height, and by providing a removable extension 30 for each end of the rack, which is supported at the lower end by a bracket 31, attached to one of the uprights 4', and by a clip 32 attached to the extension 30 itself, which is inserted in an opening 33 in the top of the rack. These extensions 30 are formed only with catches for engaging the trays in their uppermost position. In this position, they are unloaded, and so the extensions 30 bear only the weight of the trays themselves. When the trays are lowered to their unloaded position, the uppermost tray, which is pivoted adjacent the top of the upright 5', will take the position as shown in dotted outline in Fig. 8, which is very close to the top of the upright 4', at the opposite side of the pivotal point of the uppermost tray, thereby saving the space above the pivotal point of the uppermost tray, which it would be necessary to provide, if one upright is higher than the other, as shown in Fig. 2.

The catches of the forms shown in Figs. 5 and 10, are both designed and so proportioned, and the angular positions of the trays in their uppermost and lowermost positions, are such that when a tray is swung from its lowermost position, parallel to the fixed tray 7, the latches 14 will clear all the intermediate brackets or catches, until they strike that catch which engages the latches of the tray in its uppermost position. In the constructions shown, there are three intermediate catches, (see Fig. 12). The engaging surfaces of the catches and the latches 14 are angular, so that when they are in engagement, they tend to draw the uprights 4 or 4' inwardly, thereby strengthening the upright structure of the rack, and tending to hold it in a more firm and rigid position. The upper edge of each latch 14, and the lower surfaces of the catches are beveled, so that when the trays and latches are raised, they will be sprung inwardly because of the engagement of the beveled surfaces, the springs 17 tending to press the latches outwardly into position to engage the catches. By so proportioning the parts that the trays are actually engaged only at their uppermost and lowermost positions, there is no danger that the trays will be stopped in any intermediate position, thus avoiding repeated or continued holding of the latches out of engaging position when lowering the trays, and preventing the trays from being bumped or jarred in lowering them.

I claim:

1. In a loading rack, a tray pivoted at one side in the rack and movable from an article holding position to a different angular position above the holding position, and fixed brackets at the other side of the rack to support the tray in both positions.

2. In a loading rack, the combination with a plurality of uprights, of trays hinged at one side on the uprights, and means in connection with the opposite uprights for engaging the unhinged side of each tray and for holding it in a lower article-holding position at one angle and at an upper angular position to uncover the trays below it.

3. A loading rack comprising an upright frame, a plurality of trays hinged in one side of the frame, fixed projecting means at the other side of the frame, and latches at the unhinged side of each tray for engaging the projections to hold each tray in either one of two inclined positions.

4. A loading rack comprising a frame, a plurality of trays hinged to one side of the frame, spring-pressed catches at the other side of each tray, and a plurality of brackets secured to the other side of the frame having means for engaging the latches of each tray and for holding the trays in either one of two positions.

5. In a loading rack, the combination with a plurality of hinged trays, of latches at the unhinged side of each tray and brackets engaged by the latches, the lower brackets being adapted to hold the lower trays only in a downwardly inclined position, the upper brackets being adapted to hold the upper trays only in an upwardly inclined position, and the intermediate brackets being adapted to engage one tray in its downwardly inclined position and another tray in its upwardly inclined position.

6. In a loading rack, the combination with a plurality of hinged trays, of spring-pressed latches at the unhinged side of each tray, means for operating the latches, and a plurality of brackets having projections with inclined under faces which move the latches inwardly against their springs when the trays are raised against the projections.

7. A loading rack comprising a wheeled truck, uprights supported by the truck, a plurality of superposed trays hinged at one side in the uprights, a plurality of brackets at the unhinged side of the trays, and latches with means for operating them at the unhinged side of each tray for engaging the projections whereby each tray can be moved and held in either of two inclined positions one at an angle to the other.

8. In a loading rack, the combination with a plurality of trays hinged at one side of the rack, means at the other side of the rack for engaging and holding the trays in either one of two positions inclined to each other, said means comprising projections extending inwardly from the rack, latches mounted on each tray for engaging the projections, and a hand lever in connection with each tray for controlling the operation of the latches.

9. In a loading rack, the combination with a plurality of trays hinged at one side thereof, of means at the other side of the rack and trays for engaging and holding each tray in either one of two different positions, said means comprising latches and a hand lever for operating the latches, and an eyebolt secured to the front of each tray to which the hand lever is pivoted, the eyebolt serving to form a means for attachment for raising and lowering the tray.

10. A loading rack comprising a frame and a plurality of trays hinged at one side in the frame, means at the other side of the frame for engaging and holding each rack in a lower inclined position and in an upper inclined position, and a tray fixed at the bottom of the frame below the lowermost hinged tray and inclined parallel to the lowermost position of the lowermost hinged frame.

11. A rack comprising an upright frame supporting brackets at one side of the frame, and trays pivoted in the frame at the other side having means for engaging the brackets only in two positions, one at an angle below the horizontal and the other at an angle above the horizontal.

12. A rack comprising an upright frame, a plurality of trays hinged in the frame at one side thereof, and brackets at the other side of the frame for holding each tray in two positions, one position at an angle below the horizontal and the other at an angle above the horizontal, the trays being so pivoted and arranged with respect to the brackets that they engage only one bracket below the horizontal and one bracket above the horizontal.

13. A rack comprising an upright frame, a plurality of trays hinged in one side thereof, and a plurality of brackets at the other side of the frame for engaging and holding each of the trays at two different inclinations, one below the horizontal and the other above the horizontal with a plurality of brackets between the upper and lower holding brackets for any tray, the said trays being so pivoted and the brackets so arranged that the tray will engage only its own brackets in the upper and lower positions, rotating clear of the other brackets.

14. The combination with a supporting structure, of trays hinged at one side thereof, and means at the other side for engaging and holding each of the trays in two angular positions one above and the other below the horizontal.

15. A rack having an upright frame, trays hinged at one side in the frame, and means coöperating with the trays and frame at the other side of the frame for engaging and holding the unhinged side of each tray in an inclined article-holding position below the horizontal and at an inclined position above the horizontal to uncover the trays below it to facilitate loading of the trays immediately below.

16. In a loading rack, a rectangular upright frame, a plurality of trays hinged at one side thereof, and means at the other side of the frame and said tray for engaging and holding the unhinged sides of the trays in engagement with the frame, said means comprising members with beveled edges to engage and draw the frame inwardly.

17. A rack comprising a rectangular frame with corner uprights, trays hinged in the uprights at one side of the frame, brackets secured to the uprights at the other side thereof having beveled catches, and releasable latches in connection with the unhinged side of each tray for engagement with corresponding brackets, said latches having beveled surfaces which pass over the brackets in one direction and engage the catches in the other direction tending to draw the uprights inwardly.

18. In an insulator holding rack, a plurality of inclined but movable trays having shelves therein for holding insulators in an upright position and in tiers partially overlapping each other and means for holding the trays in the inclined position.

19. A holding rack for flanged insulators having inclined but movable trays, each tray being formed with a plurality of shelves for holding insulators in an upright position and in tiers so that the flange of one insulator partially overlaps the insulator in the adjacent tier, separate means for holding unloaded trays in an inclined position above the horizontal and means for holding the trays in the inclined position.

20. A loading rack comprising an upright frame, trays hinged at one side therein, movable from an article holding position below the horizontal to a position above it, supports in said trays which are upright when the trays are in the lower position, and means at the other side of the frame for separately holding each tray in one of its two positions.

21. A loading rack comprising an upright frame, trays hinged at one side therein, movable from an article holding position below the horizontal to a position above it, a plurality of supports extending lengthwise of the trays having their tops in different horizontal planes one above the other when the trays are in the lower position, and means at the other side of the frame for separately holding each tray in one of its two positions.

22. A rack comprising an upright frame, a plurality of trays hinged at one side of the frame, and means for holding each tray in either one of two positions at an inclination above and below the horizontal, the tray holding means including a removable portion extending above the pivotal point of the uppermost tray.

23. A loading rack comprising an upright frame, a plurality of trays hinged at one side of the frame, means at the other side of the frame for engaging and holding each tray when loaded in an inclined position below the horizontal and in an upper inclined position above the horizontal, the uppermost trays extending above the pivotal point of the uppermost trays in their upper position, and a removable frame portion extending above the pivotal point of the uppermost tray for holding the said trays in their uppermost position.

In testimony whereof I have signed my name to this specification, in the presence of two subscribing witnesses, on this 9th day of May, A. D. 1916.

ARTHUR O. AUSTIN.

Witnesses:
E. B. SNYDER,
GEORGE E. WILLIS.

Copies of this patent may be obtained for five cents each, by addressing the "Commissioner of Patents, Washington, D. C."